Aug. 4, 1953
J. M. KERR
2,647,589
BRAKE DRUM LUBRICANT DEFLECTOR
Filed June 12, 1950
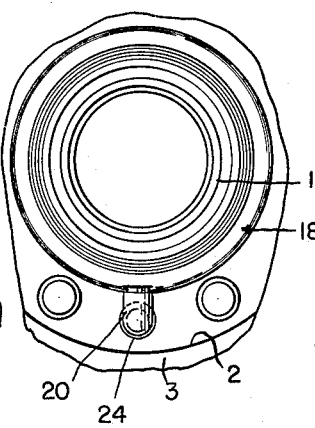
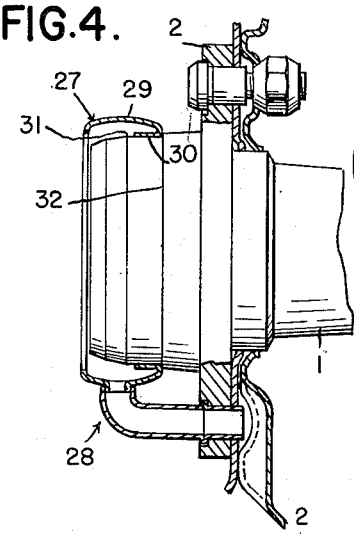
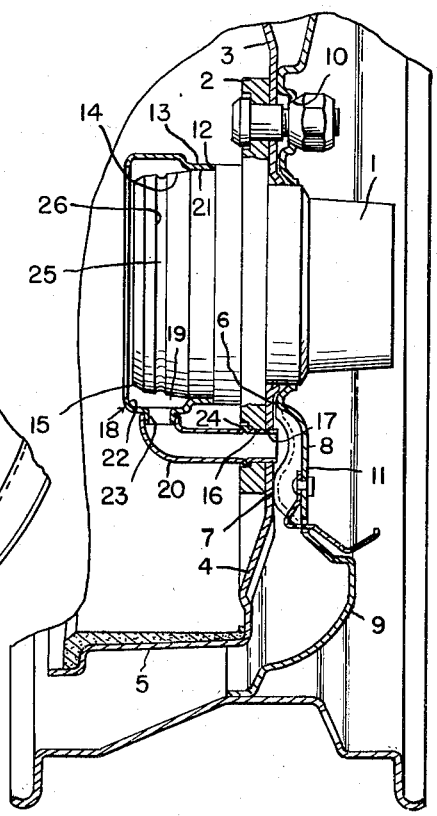
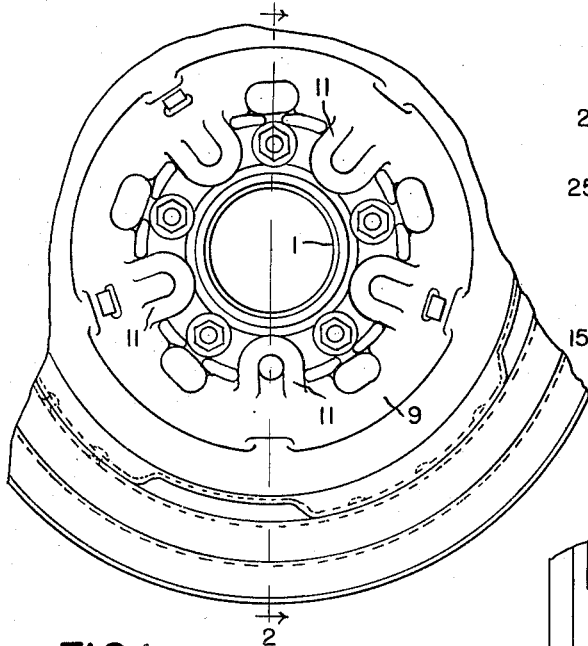
INVENTOR.
JAMES M. KERR
BY
ATTORNEYS Patented Aug. 4, 1953

2,647,589

UNITED STATES PATENT OFFICE 2,647,589

BRAKE DRUM LUBRICANT DEFLECTOR

James M. Kerr, Detroit, Mich., assignor to Kelsey-Hayes Wheel Company, Detroit, Mich., a corporation of Delaware Application June 12, 1950, Serial No. 167,531

6 Claims. (Cl. 184—106)

The invention relates to wheel and brake drum assemblies and refers more particularly to assemblies of vehicle wheel hubs and brake drums for use with internal brakes.

The invention has for one of its objects to provide an improved assembly embodying means for protecting the interior of the brake drum from lubricant leaking from the hub.

The invention has for another object to so construct the wheel hub, brake drum and lubricant deflector assembly that any lubricant leaking from the hub is collected and conducted to a point outside the brake drum.

The invention has for still another object to so construct the assembly that the lubricant is conducted through the fixed radial flange of the hub and the web of the brake drum.

The invention has for a further object to so construct the assembly that the lubricant is conducted to the space formed by one of the radial reinforcing ribs of the bolting-on flange of the wheel, thereby making use of the rib in the discharge of the lubricant.

With these and other objects in view the invention resides in the novel features of construction and combinations and arrangements of parts as more fully hereinafter set forth.

In the drawings:

Figure 1 is an outboard elevation of an assembly embodying the invention;

Figure 2 is a cross section on the line 2—2 of Figure 1;

Figure 3 is an inboard elevation omitting a portion of the brake drum and the vehicle wheel.

Figure 4 is a view similar to a portion of Figure 2 showing a modified construction.

As illustrated in the present instance, 1 is the vehicle wheel hub having the fixed radially extending annular flange 2 against the axially outer or outboard side of which is secured the web 3 of the brake drum 4 having the annular brake flange 5 for engagement by the brake shoes of an internal brake. The web 3 is adapted to be abutted by the radially spaced faces 6 and 7 of the bolting-on flange 8 of the vehicle wheel body 9. The bolting-on flange is provided with the bolt holes 10 radially between the faces 6 and 7 and also with the radially extending reinforcing ribs 11 circumferentially between the bolt holes 10 and the faces 7, the ribs providing spaces at their axially inner or inboard sides which open radially outwardly.

For the purpose of protecting the brake drum 4, and more particularly the internal surface of the annular flange 5 of the brake drum, from lubricant leaking from the axially inner or inboard end of the hub, I have provided means for collecting and conducting the lubricant through the fixed flange 2 of the hub and the web 3 of the brake drum to the space formed by one of the radial reinforcing ribs 11 of the wheel body and the brake drum web. More particularly, the portion of the hub axially inwardly of the fixed flange 2 is formed with the radially extending annular shoulder 12, cylindrical portion 13 extending axially inwardly from the shoulder, the axially inwardly tapered portion 14 extending from the cylindrical portion 13 and the portion 15 extending from the portion 14 and tapered axially inwardly at a greater angle, the portion 15 terminating at the inboard end of the hub. Also the fixed flange 2 of the hub and the web 3 of the brake drum are formed with the axially aligned openings 16 and 17 respectively, the openings being angularly positioned to register with one of the radial reinforcing ribs 11 of the wheel body. In addition there is the lubricant deflector 18 comprising the lubricant collecting ring 19 and the conduit 20. The ring has the channel shaped axially inner portion 22 and the cylindrical axially outer portion 21, the portion 21 having a press fit with the cylindrical portion 13 of the hub and abutting the shoulder 12 and the portion 22 being radially spaced from the hub and having its axially inner inturned flange located axially inwardly beyond the inboard end of the hub. The conduit 20 is sleeved over the radially outwardly extending annular flange 23 formed in the base of the portion 22 and extends through the aligned openings 16 and 17 and terminates slightly beyond the outboard side of the brake drum web. The conduit is formed with the annular shoulder 24 abutting the inboard side of the fixed flange 2 which limits the axially outward movement of the conduit. In the present instance, the annular shoulder 24 is formed by crimping the conduit, and the fixed flange 2 is provided with an annular recess for receiving the crimp. In the present instance the wheel hub is formed with the annular groove 25 in its tapered portion 14 which provides the annular shoulder 26 adapted upon rotation of the wheel hub to sling any lubricant which might have crept axially outwardly along the hub from its inboard end.

As shown in Figure 4, the general construction is essentially the same as that illustrated in Figures 1, 2 and 3 with the exception that the lubricant collecting ring 27 of the lubricant deflector 28 is formed of the generally channel shaped portion 29 and the cylindrical portion 30 which is located within the portion 29 and extends axially inwardly from its axially outer edge. The cylindrical portion has a press fit with the cylindrical portion 31 of the hub and the ring is axially positioned with respect to the wheel hub by abutting the radially extending annular shoulder 32 at the axially inner end of the cylindrical portion 31.

What I claim as my invention is:

1. A wheel hub, brake drum, and lubricant deflector assembly comprising a hub having a fixed radial flange and an annular shoulder between said flange and the inboard end of said hub, a brake drum having a web secured against the outboard side of said flange and a lubricant deflector provided with a lubricant collecting ring having a press fit with said hub and abutting said shoulder and extending beyond and encircling said inboard end of said hub and a lubricant conducting conduit leading from said ring through said flange and web.

2. A wheel hub brake drum and lubricant deflector assembly comprising a hub having a fixed radial flange and an annular shoulder intermediate the inboard end of said hub and said flange, a brake drum having a web secured against said flange and a lubricant deflector provided with a lubricant collecting ring extending beyond and encircling said inboard end of said hub and having an intermediate portion encircling said annular shoulder and an axially outer portion having a press fit with said hub and a lubricant conducting conduit leading from said ring through said flange and web.

3. A wheel hub, brake drum and lubricant deflector assembly comprising a hub having a fixed radial flange, a brake drum having a web secured against the outboard side of said flange, said flange and web having aligned axial holes therethrough, means for securing a vehicle wheel bolting-on flange having a radial hollow rib bossed in an outboard direction against the outboard side of said web with the rib forming a space registering with said holes, and a lubricant deflector having a lubricant collecting ring secured to said hub inboard of said flange and encircling and extending beyond the inboard end of said hub and a lubricant conducting conduit leading from said ring through said holes.

4. A wheel hub, brake drum and lubricant deflector assembly comprising a hub having a fixed radial flange, a brake drum having a web secured against said flange, said flange and web having aligned axial holes therethrough, means for securing a vehicle wheel bolting-on flange having a radial hollow rib bossed in an outboard direction to said hub with the rib forming a space registering with said holes and a lubricant deflector having a lubricant collecting ring secured to said hub inboard of said flange and encircling and extending beyond the inboard end of said hub and a lubricant conducting conduit leading from said ring through said holes.

5. A wheel hub, brake drum and lubricant deflector assembly comprising a hub having a fixed radial flange, a cylindrical portion between said flange and the inboard end of said hub and an annular shoulder at the outboard end of said cylindrical portion, a brake drum having a web secured against said flange and a lubricant deflector provided with a lubricant collecting ring having a tight fit with said cylindrical portion and abutting said shoulder and extending beyond and encircling said inboard end of said hub and a lubricant conducting conduit leading from said ring through said flange and web.

6. A wheel hub, brake drum and lubricant deflector assembly comprising a hub having a fixed radial flange and provided with an annular shoulder between said flange and the inboard end of said hub, a brake drum having a web secured against said flange, said flange and web having aligned axial holes therethrough, and a lubricant deflector provided with a lubricant collecting ring abutting said annular shoulder and having a tight fit with the portion of said hub inboard of said annular shoulder and extending beyond and encircling the inboard end of said hub and a lubricant conducting conduit leading from said ring through said holes.

JAMES M. KERR.

References Cited in the file of this patent

UNITED STATES PATENTS

| Number | Name | Date |
|---|---|---|
| 1,816,173 | Booth | July 28, 1931 |
| 1,914,575 | Main | June 20, 1933 |
| 2,497,031 | MacPherson | Feb. 7, 1950 |

FOREIGN PATENTS

| Number | Country | Date |
|---|---|---|
| 557,249 | France | Apr. 30, 1923 |